US009678653B1

(12) United States Patent
Manyam

(10) Patent No.: US 9,678,653 B1
(45) Date of Patent: Jun. 13, 2017

(54) PORTABLE ELECTRONIC LIGHT INTENSITY CONTROLLING DEVICE AND METHOD HAVING AN ACCESSORY HOUSING REMOVABLY COUPLED TO AT LEAST A PORTION OF AN EXTERIOR PROFILE OF A DEVICE HOUSING

(75) Inventor: Vijay Manyam, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 833 days.

(21) Appl. No.: 12/973,582

(22) Filed: Dec. 20, 2010

(51) Int. Cl.
*G06F 3/0487* (2013.01)
*G06F 3/0488* (2013.01)
*G06F 3/0483* (2013.01)

(52) U.S. Cl.
CPC .......... *G06F 3/0487* (2013.01); *G06F 3/0488* (2013.01); *G06F 3/0483* (2013.01)

(58) Field of Classification Search
CPC ........ G01J 1/10; G01J 1/16; G01J 1/18; G01J 1/20; G01J 1/28; G01J 1/30; G01J 1/42; G01J 1/4204; H05B 33/00; H05B 33/0833; H05B 33/0842; H05B 33/0845; H05B 37/0218; Y02B 20/46; G06F 3/0487; G06F 3/0488; G06F 3/04883; G06F 3/04886; G06F 3/0489
USPC ...... 250/205, 239, 221, 216, 227.11, 227.14, 250/227.2, 227.21, 227.24, 214 A L; 315/307, 308, 291, 149–156, 158, 159; 362/800; 345/156, 173, 175, 176, 204, 345/207, 690–697, 211, 212, 32, 48, 63, 345/76–82
See application file for complete search history.

(56) References Cited

U.S. PATENT DOCUMENTS

| 5,091,832 | A | * | 2/1992 | Tortola et al. | ................ | 362/109 |
| 6,094,185 | A |   | 7/2000 | Shirriff |   |   |
| 6,474,823 | B1 |   | 11/2002 | Agata et al. |   |   |
| 6,527,409 | B1 | * | 3/2003 | Naghi et al. | .................. | 362/186 |
| 6,567,137 | B1 |   | 5/2003 | Moon |   |   |
| 6,767,107 | B1 | * | 7/2004 | Leifer | ..................... | A63F 13/02 |
|   |   |   |   |   |   | 362/109 |
| 6,825,828 | B2 |   | 11/2004 | Burke et al. |   |   |
| 7,079,119 | B2 | * | 7/2006 | Hanson et al. | ................ | 345/175 |

(Continued)

FOREIGN PATENT DOCUMENTS

JP    2006254304    9/2006

OTHER PUBLICATIONS

Final Office Action for U.S. Appl. No. 12/545,514, mailed on Aug. 6, 2012, James Samuel Bowen et al., "Light Sensor to Adjust a Display", 26 pages.

(Continued)

*Primary Examiner* — Que T Le
(74) *Attorney, Agent, or Firm* — Lee & Hayes, PLLC

(57) ABSTRACT

Various front light accessories are disclosed that may be used with or coupled to an electronic device to provide light to an outward surface of a reflective light display. A front light accessory may include a light sensor to measure an intensity of ambient light and then control an amount of light emitted by the front lights based on the measured ambient light. In some instances, the front light accessories may share resources such as hardware and software from the electronic device to control an amount of light emitted from the front lights, to provide power to the front lights, and/or for other reasons.

21 Claims, 10 Drawing Sheets

(56) References Cited

U.S. PATENT DOCUMENTS

| | | |
|---|---|---|
| 7,787,169 B2 | 8/2010 | Abramson et al. |
| 2002/0084967 A1 | 7/2002 | Akimoto et al. |
| 2002/0118182 A1 | 8/2002 | Luther Weindorf |
| 2003/0142507 A1 | 7/2003 | Sugiyama |
| 2003/0197675 A1 | 10/2003 | Sakurai |
| 2005/0043005 A1 | 2/2005 | Anderton |
| 2005/0124389 A1 | 6/2005 | Yang |
| 2005/0212824 A1 | 9/2005 | Marcinkiewicz et al. |
| 2006/0087245 A1 | 4/2006 | Ng et al. |
| 2006/0104079 A1* | 5/2006 | Chen .................... G02B 6/0008 362/554 |
| 2006/0244702 A1 | 11/2006 | Yamazaki et al. |
| 2006/0291122 A1 | 12/2006 | Zhou et al. |
| 2007/0001940 A1 | 1/2007 | Jo |
| 2007/0146356 A1 | 6/2007 | Ladouceur |
| 2007/0229398 A1 | 10/2007 | Oh |
| 2007/0247870 A1* | 10/2007 | Sakai et al. .................... 362/612 |
| 2007/0256339 A1 | 11/2007 | Fryer et al. |
| 2008/0088576 A1 | 4/2008 | Cato |
| 2008/0186259 A1 | 8/2008 | Todorokihara et al. |
| 2008/0266243 A1 | 10/2008 | Johnson et al. |
| 2008/0278460 A1* | 11/2008 | Arnett et al. ................. 345/175 |
| 2008/0291184 A1 | 11/2008 | Zhou et al. |
| 2009/0066680 A1 | 3/2009 | Rumreich |
| 2009/0096745 A1 | 4/2009 | Sprague et al. |
| 2009/0109145 A1 | 4/2009 | Okada et al. |
| 2009/0146992 A1 | 6/2009 | Fukunaga et al. |
| 2009/0278828 A1 | 11/2009 | Fletcher et al. |
| 2010/0103186 A1 | 4/2010 | Luengen et al. |
| 2010/0123597 A1 | 5/2010 | Kitsukawa |
| 2010/0149145 A1* | 6/2010 | Van Woudenberg et al. .............................. 345/207 |
| 2010/0177076 A1 | 7/2010 | Essinger et al. |
| 2010/0188327 A1 | 7/2010 | Frid et al. |
| 2010/0295873 A1 | 11/2010 | Dodge et al. |
| 2011/0037576 A1* | 2/2011 | Jeon et al. ................. 340/407.2 |
| 2011/0141078 A1* | 6/2011 | Raynor .................... G01J 1/18 345/207 |
| 2011/0285616 A1 | 11/2011 | Gong et al. |

OTHER PUBLICATIONS

"Auto/Brightness/Light Sensor", Winmate Light Sensor—Panel PC, retrieved on Sep. 8, 2009 from <<www.winmate.com.tw/light_sensor.htm>>, 1 pg.

"PowerBook G4 (17-inch), (15-inch FW 800): How the Ambient Light Sensor Works", retrieved on Sep. 8, 2009 from <<http://support.apple.com/kb/TA27057?viewlocal=en_US>>, Sep. 18, 2003, 1 pg.

Non-Final Office Action for U.S. Appl. No. 12/545,514, mailed on Feb. 9, 2012, James Samuel Bowen et al., "Light Sensor to Adjust a Display", 22 pages.

Office action for U.S. Appl. No. 12/973,500, mailed on Mar. 14, 2013, Manyam et al., "Display Adjustments Using a Light Sensor", 17 pages.

Office action for U.S. Appl. No. 12/545,514, mailed on Dec. 26, 2012, Bowen, "Light Sensor to Adjust Contrast or Size of Objects Rendered by a Display", 28 pages.

Office Action for U.S. Appl. No. 12/545,514, mailed on May 23, 2013, Bowen, "Light Sensor to Adjust Contrast or Size of Objects Rendered by a Display", 27 pages.

Office Action for U.S. Appl. No. 12/973,500, mailed on Dec. 23, 2013, Vijay Manyam, "Display Adjustments Using a Light Sensor", 23 pages.

Office action for U.S. Appl. No. 12/973,500, mailed on Jun. 10, 2014, Manyam et al., "Display Adjustments Using a Light Sensor", 28 pages.

Final Office Action for U.S. Appl. No. 12/973,500, mailed on Jun. 9, 2015, Vijay Manyam, "Display Adjustments Using a Light Sensor", 32 pages.

Office Action for U.S. Appl. No. 12/973,500, mailed on Dec. 17, 2014, Vijay Manyam, "Display Adjustments Using a Light Sensor", 30 pages.

Office action for U.S. Appl. 12/973,500, mailed on Dec. 1, 2015, Manyam et al., "Display Adjustments Using a Light Sensor", 35 pages.

Office action for U.S. Appl. No. 12/973,500, mailed on Jun. 2, 2016, Manyam et al., "Display Adjustments Using a Light Sensor", 28 pages.

Office action for U.S. Appl. No. 12/545,514, mailed on Oct. 24, 2013, Bowen, "Light Sensor to Adjust Contrast or Size of Objects Rendered by a Display", 26 pages.

Office action for U.S. Appl. No. 12/973,500, mailed on Aug. 27, 2013, Manyam et al., "Display Adjustments Using a Light Sensor", 21 pages.

* cited by examiner

800

802 ─→  804 ─→  806 ─→

DISPLAY PROFILES

| LIGHT INTENSITY | TEMPERATURE (°F) | WAVEFORM |
|---|---|---|
| .1-.3 | 0-30 | $\lambda=a$ |
| .4-.6 | 0-30 | $\lambda=a+x$ |
| .7-.9 | 0-30 | $\lambda=a+y$ |
| .1-.3 | 31-60 | $\lambda=b$ |
| .4-.6 | 31-60 | $\lambda=b+x$ |
| ⋮ | ⋮ | ⋮ |
| .7-.9 | 91-120 | $\lambda=n+y$ |

FIG. 8

PORTABLE ELECTRONIC LIGHT INTENSITY CONTROLLING DEVICE AND METHOD HAVING AN ACCESSORY HOUSING REMOVABLY COUPLED TO AT LEAST A PORTION OF AN EXTERIOR PROFILE OF A DEVICE HOUSING

BACKGROUND

Electronic display devices are widely used to convey information to users. This information varies from the time of day shown on a wrist watch to information from an Internet site displayed by a smart mobile telephone. Electronic display devices are used in many environments and thus operate in varying degrees of ambient light and in various temperatures. For example, a display device that operates outside near the South Pole in the winter may experience little ambient light and may be subjected to very cold temperatures. Conversely, a display device operating near the equator may experience considerably warm temperatures and plenty of ambient light from sunlight during the daytime. Unfortunately, these differing environmental conditions may affect the ability of users to view information on their electronic display devices.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is chart of illustrative display profiles that may be used to update a visual representation of content using measured light intensity of ambient light.

DETAILED DESCRIPTION

Overview

Figure 1:
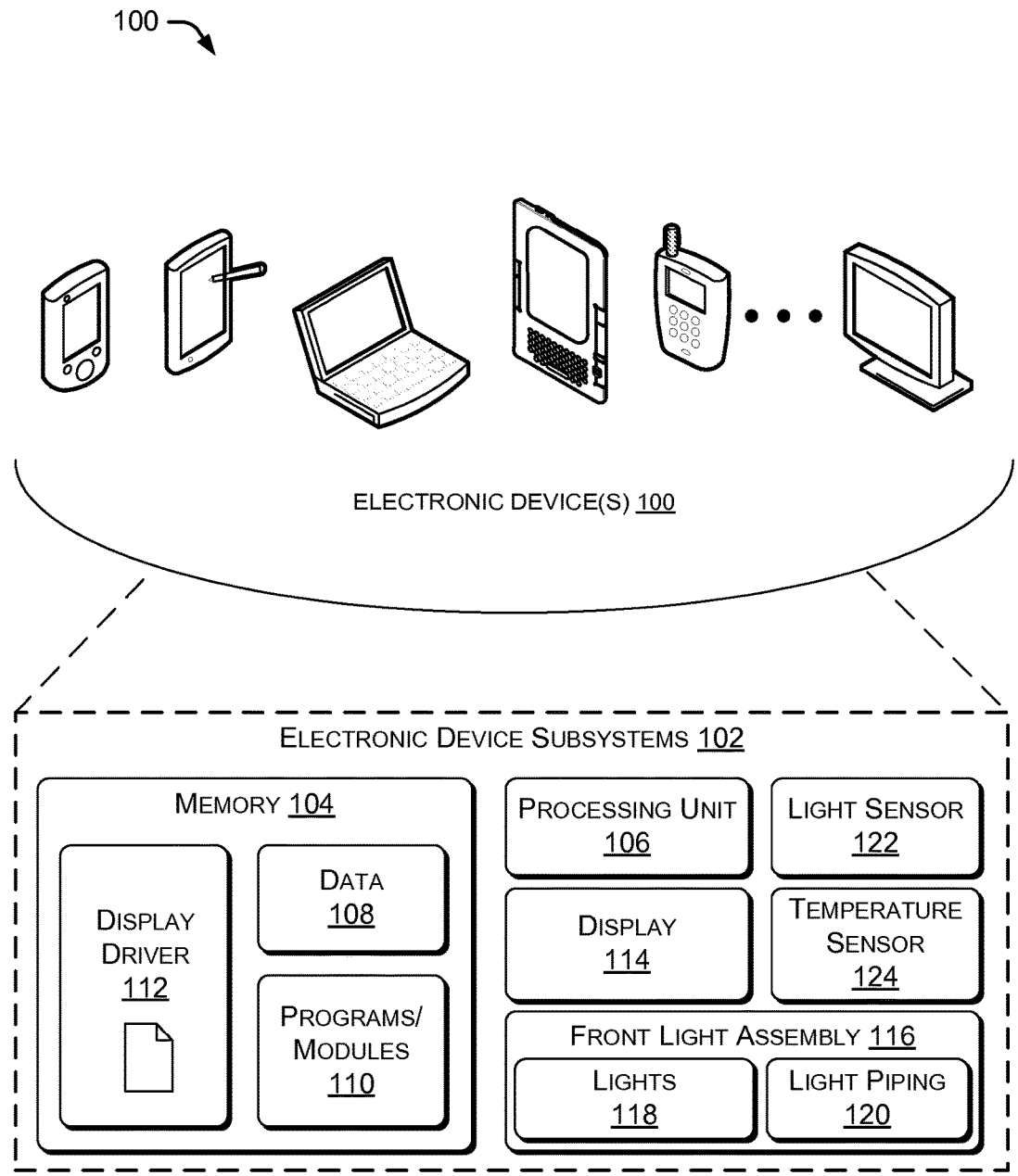
FIG. 1 is a schematic diagram of illustrative subsystems of various computing devices that render a display based on measured light intensity.

As discussed above, electronic devices may be used in various environments that may include different light intensities of ambient light. Disclosed herein are various techniques and apparatuses to adjust a display based on a measured light intensity of ambient light to improve a user's ability to view content (readable text, imagery, etc.) presented by the display. Adjustments to a visual representation of content of the display may be performed with or without user input, thereby enabling the user to avoid or reduce time spent adjusting the display. Therefore, this disclosure describes various illustrative techniques and apparatuses for providing adjustments based on measured light intensity of the ambient light to optimize a user experience viewing content on a display of an electronic device, such as an electronic book (eBook) reader device.

The display of an electronic device may be selected from various types of displays, where some displays rely on reflective light in low light conditions and are thus are commonly referred to as front lit displays. Electronic paper displays are one common type of display that uses reflective light. The electronic paper displays move particles through associated capsules within the display to render content on the display, such as text, images, or other types of content. Typically, the particles represent a pixel of content and the capsules are aligned substantially perpendicular (e.g., within typical manufacturing tolerances) to a display surface. As used herein, the term particle is intended to include fluid ink, spherical-shaped matter, and other matter used to visually render content in electronic paper displays.

In one or more implementations, a measurement of ambient light may be used to adjust an intensity of a front lighting component used to provide light on a front side of an electronic display, such as an electronic paper display. The intensity of light from the front lighting component may be adjusted by dimming (or intensifying) some or all of the lights in an assembly or selectively turning off (or on) some of the lights in the assembly.

In some implementations, the measured ambient light may be used to adjust an object size (e.g., font size, image size, etc.) of an object that is presented on the display. For example, when the ambient light is relatively high, the font size may be decreased (or increased in some instances), where a decrease in object size may enable more content to be presented in a display space. Conversely, when the ambient light is subsequently measured to be relatively low, the object size may be increased (or decreased in some instances) to improve detection and interpretation of the object in a low-light environment.

In various implementations, the measured ambient light may be used to adjust a contrast of the image or text that is presented on the display. For example, the electronic device may increase (or decrease in some instances) a display contrast in response to an increase in light intensity of the ambient light to improve a user's ability to view content on the display. When the display is an electronic paper display, the measured levels of ambient light may be used to modify waveform adjustments that are used to move the particles through associated capsules. Adjustments to the waveform ultimately impact the contrast of the content presented via the display.

The techniques and apparatuses described herein may be implemented in a number of ways and in a number of environments. A few of many example implementations are provided below with reference to the following figures.

Illustrative Light Sensor Device

FIG. 1 is a schematic diagram of illustrative electronic display devices (or simply "devices") 100 having subsystems that render a display based at least in part on measured light intensity of ambient light. In the illustrated implementation, the devices 100 are represented by various electronic devices, each of which includes a display. A non-exhaustive list of the devices 100 may include a notebook computer, a music player, a personal digital assistant (PDA), a mobile telephone (including smartphones), a tablet computer, an electronic book (eBook) reader, a netbook computer or a monitor (with or without a television tuner), and so forth. However, virtually any other type of electronic display device may be used and may be configured to adjust the rendering of content on a display based on measured ambient light using the techniques described herein.

As illustrated, the devices 100 may include electronic device subsystems 102. In some embodiments, the subsystems 102 include memory 104 and a processing unit 106. The processing unit 106 interacts with the memory 104 to facilitate operation of the electronic device 100. The memory 104, meanwhile, may be used to store data 108, such as data files, audio and/or video media, eBooks, or the like. The memory 104 may also include software programs or other executable modules 110 that may be executed by the processing unit 106. Examples of such programs or modules include indexing modules for indexing data, reader programs, control modules (e.g., power management), network connection software, an operating system, sensor algorithms, page turn detectors, and the like.

The subsystems 102 also include a display driver 112, which may be used to render a visual representation of content (e.g., text, images, etc.) on a display 114 based on a measured level of ambient light and/or other inputs (e.g., user input, temperature input, etc.). In various embodiments, the display driver 112 may adjust one or more of a light intensity of a front light assembly 116, a contrast of the display, or a display size of content rendered on the display based at least in part on a measured light intensity of ambient light to improve the visibility of the content. For instance, the size of text (font size) and/or size of an image may be increased (or decreased in some instances) by the device 100 when a measured level of ambient light indicates that a light intensity has decreased since a previous measurement of ambient light, such as the immediately previous measurement of light. The front light assembly 116 may include lights 118 (e.g., light emitting diodes (LED's) or other types of lights), and light piping 120 to disperse light from the lights 118 to illuminate the display 114.

In accordance with various embodiments, a light sensor 122 is provided to measure the light intensity of the ambient light. The light sensor 122 may generate a signal after a user command (e.g., a command to turn a page in an eBook, refresh a page, etc.), after a periodic or random duration of time, or after other events or commands. The signal may be received by the display driver 112, which may interpret the signal and adjust the display, possibly including the illumination from the front light assembly 116, according to the measured light intensity.

In some embodiments, a temperature sensor is included in the electronic device 100 to enable adjustment of display characteristics when the electronic device is exposed to various temperatures over a period of time. Mobile electronic devices may experience large temperature changes (in excess of 50 degrees Fahrenheit) over a matter of minutes such as when a person moves the mobile electronic device outside a heated building on a cold winter day. When the display 114 is an electronic paper display, temperature may have a considerable impact on the operation of the display mechanisms (i.e., movement of particles through associated capsules to render individual pixels). An electronic paper display uses a manipulation of the particles to create a visual representation of content on the display 114. The particles are moved along associated capsules, as determined by the display driver, to render the visual representation. When the temperature is cool, the particles move slower than when the temperature is warm, which impacts the perceived contrast of the rendered visual representation. Thus, temperature, in addition or in the alternative to the measured level of ambient light, may be used by the display driver 112 to optimize the visual representation of content provided on the display 114 for consumption by a user.

The memory 104 may include volatile memory (such as RAM), nonvolatile memory, removable memory, and/or non-removable memory, implemented in any method or technology for storage of information, such as computer-readable instructions, data structures, program modules, or other data. Also, the processing unit 106 may include onboard memory in addition to or instead of the memory 104. Some examples of storage media that may be included in the memory 104 and/or processing unit 106 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the electronic device 100. Any such computer-readable media may be part of the electronic device 100.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit 106, as hardware, and/or as firmware. Typically, the functionality of the program modules may be combined or distributed as desired in various embodiments. An implementation of these modules and techniques may be stored on or transmitted across some form of computer-readable media.

Figure 2:
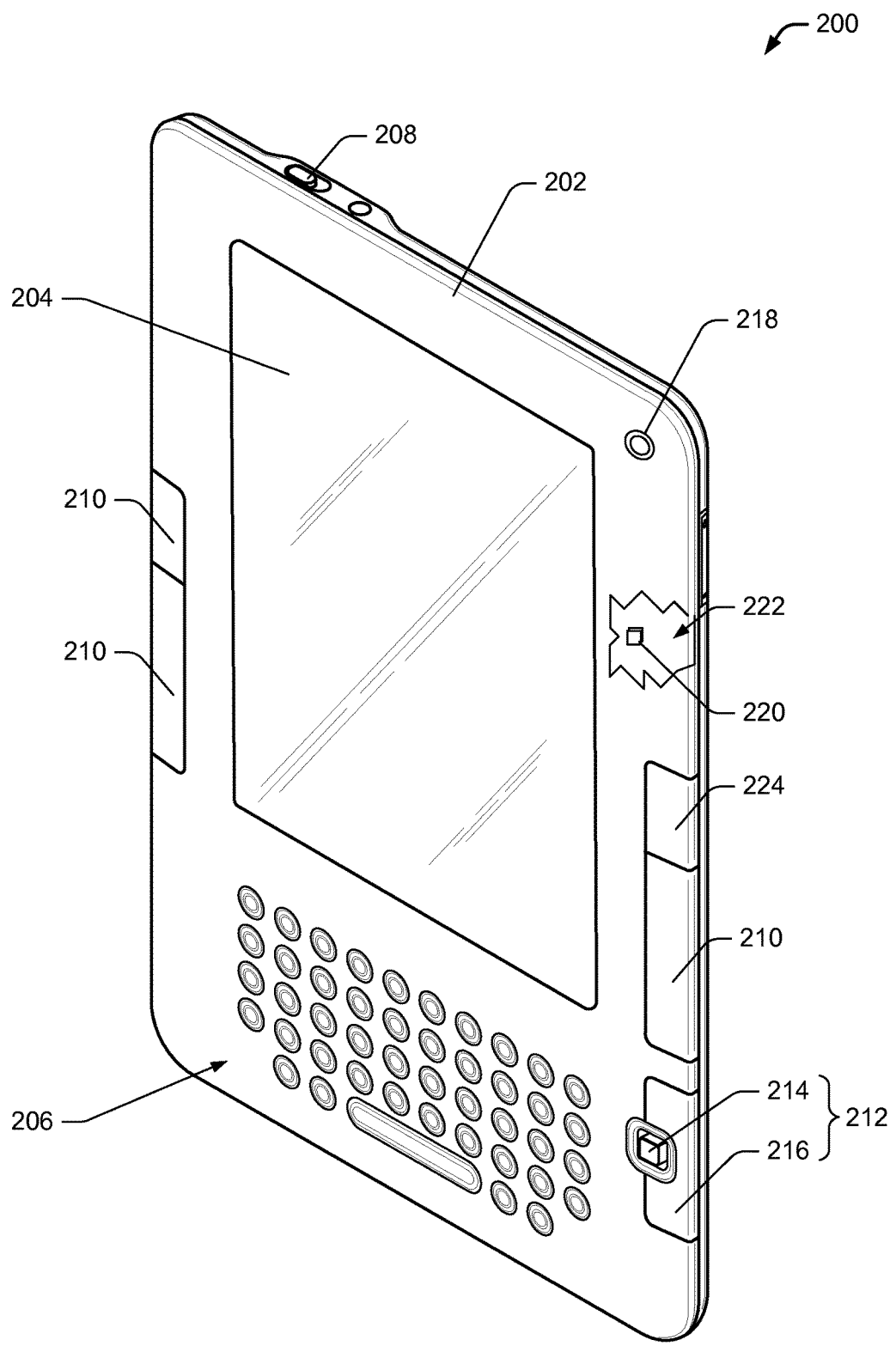
FIG. 2 is a schematic diagram of an illustrative display device that includes a light sensor to measure ambient light for adjusting display characteristics.

FIG. 2 is a schematic diagram of an eBook reader device 200 that includes a light sensor to measure ambient light for adjusting display characteristics of content rendered on the device. The eBook reader device 200 is one example of the electronic devices 100 of FIG. 1, and is used to illustrate concepts that may be applied to various other electronic display devices 100 as discussed with reference to FIG. 1.

The eBook reader device 200 has a body or housing 202, a display 204 for displaying information to a user, and a user interface to allow a user to interact with the eBook reader device. In this example, the display 204 comprises an electronic paper display, such as those made by E Ink® Corporation of Cambridge, Mass. The display 204 may also include the front light assembly 116, which is shown and described in detail with reference to FIG. 3. The user interface comprises a variety of mechanisms for users to interact with the eBook reader device 200 including a keypad 206, an on/off slider 208, multiple buttons 210, and a user interface cluster 212 including a joystick 214 and a pivot button 216. In some implementations, the display 204 may also comprise a user interface mechanism in the form of a touch screen.

In accordance with one or more embodiments, the eBook reader device 200 also includes a light sensor 218 to measure light intensity of ambient light. The light sensor 218 (i.e., a photodetector) is a sensor capable of measuring light and generating a signal that may be converted to a light intensity or light value that is representative of the amount of light visible in a particular direction or space. The light sensor 218 may comprise an optical detector, a chemical detector, a photoresistor, or any other type of sensor capable of measuring light intensity. In some embodiments, the light sensor 218 may be located proximate the display 204 and directed substantially perpendicular (e.g., less than one degree from perpendicular, less than five degrees, less than 20 degrees, etc.) to a plane created by the display. In this way, the light sensor 218 may measure the intensity of light that is directed to the display 204 and that enables a user to see the content on the display.

The light sensor 218 may determine the light intensity, which may be used to adjust a visual representation of content on the display 204 and/or an intensity of light provided by the front light assembly 116. In some embodiments, the light sensor 218 may measure a high light intensity and, in response, the light sensor 218 may generate a signal that is processed by the display driver 112 to increase (or decrease) the contrast and/or size of the objects in the visual representation and/or dim or turn off the lights 118 of the front light assembly 116.

As an example, a user may be viewing content on the eBook reader device 200 with a reflective light display in a location having a relatively high intensity of ambient light (e.g., outside in a sunny environment). The user may then move to a new location having less light intensity (e.g., inside a building). The techniques described above may detect a decrease in the light intensity at the new location and automatically increase the contrast and/or size of displayed objects on the reflective light display to improve the visibility of the content on the display 204 in the less intense ambient light. In addition, the techniques may also adjust a light intensity of the lights 118 of the front light assembly 116, turn the lights on, or otherwise activate a portion of the lights 118 to illuminate the display 204. Thus, the techniques may enable the user to view content in the less intense ambient light at the new location that, without the techniques, would otherwise be difficult for the user to view. Further, it is contemplated that in some instances, the size and/or contrast may be adjusted in an opposite direction (e.g., increased rather than deceased) for backlight or reflective light displays depending on various factors, such as user preferences, availability of light, remaining battery power, and so forth.

The eBook reader device 200 may also include a temperature sensor 220. The temperature sensor 220 may be located internally within the eBook reader device 200, which is illustrated via a cutout 222 in the housing 202. In some embodiments, the temperature sensor 220 may be located proximate the display 204 to measure a temperature of particles used to render a visual representation of content for an electronic paper display. A measured temperature may be used to select a waveform value, which may ultimately determine the movement of the particles that adjusts a contrast of the visual representation.

In some embodiments, the eBook reader device 200 may include a refresh button 224. The refresh button 224 may enable a user to selectively refresh (or redraw) the visual representation of content shown by the display 204. For example, the user may move the eBook reader device 200 from a low light environment to a more intense light environment and desire a refreshed display having decreased (or increased) contrast and/or object size, which may be accomplished by selecting the refresh button 224. That is, when the user selects the refresh button 224, the light sensor 218 and/or the temperature sensor 220 may measure respective parameters of the environment and may cause a contrast and/or an object size to increase or decrease based on these measurements. In other implementations, however, the light sensor 218 and/or the temperature sensor 220 may periodically or randomly measure these parameters and correspondingly adjust the contrast and/or object size without requiring the user to select the refresh button 224 at all. In various embodiments, an adjustment may be based on predefined or user adjustable threshold levels. For example, a user may select a preferred contrast and/or object size for a particular light intensity. In some embodiments, the user may calibrate the display driver 112 by selecting preferred levels of contrast, object size, or both, which may be used to determine an appropriate setting of the contrast and/or object size when the display is subjected to various levels of light intensity.

The user interface, meanwhile, allows users to display and navigate through a collection of eBooks, web pages, audio files, video files, games, programs, and/or other electronic items. As used herein, the term eBook includes electronic copies of books, magazines, newspapers, maps, publications, and other at least partially text-based electronic documents. In other implementations, user interfaces of electronic devices may include any combination of these and other user input mechanisms.

When the display 204 is an electronic paper display, the eBook reader device may provide an easy to read presentation of content that resembles an actual printed page of text. Power consumption and page turn time of the electronic paper display are influenced by a desired contrast level obtained in a visual representation of content because additional contrast is created by applying more power (constant power over a longer duration of time) to move particles along a capsule either away from the user (lighter display of a pixel) or closer to the user (darker display of the pixel). Thus, a lower contrast setting may be used to increase page turn time and reduce power consumption because a movement of the particles to create a low contrast is less than a movement to create a high contrast.

Electronic paper displays tend to have a longer display update time than other types of displays, such as cathode ray tube (CRT) displays and liquid crystal displays (LCDs). Typically, electronic paper displays have display update times greater than about 100 milliseconds, and in some implementations, these displays may have display update times greater than about 250 milliseconds. The display time correlates to the desired contrast level obtained in a visual representation of content because additional contrast is created by moving the particles further in their respective directions in the capsules to create the additional contrast, which takes additional time to complete. Even with display update times as low as about 15 milliseconds, there may be a perceptible delay between a time when a user requests an action via the user interface and a time when that action is displayed on the display 204 by moving the particles to create the visual representation of the content (e.g., the next page of an eBook, etc.).

Figure 3:
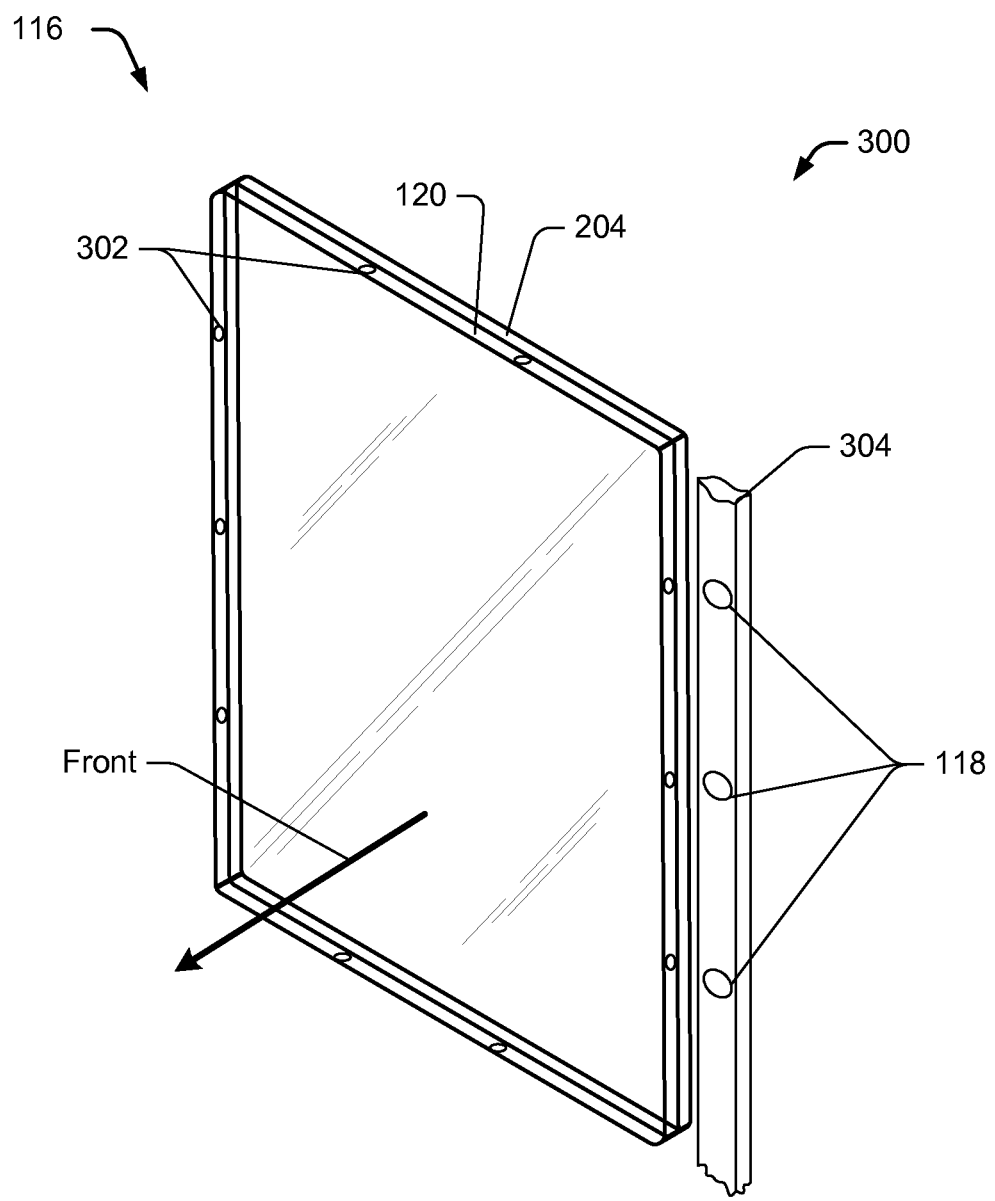
FIG. 3 is a schematic diagram of an illustrative display that includes a front light.

FIG. 3 is a schematic diagram of an illustrative display assembly 200 that includes the display 204 and at least a portion of the front light assembly 116. As shown in FIG. 3, the display assembly 200 is configured with the light piping 120 configured on a front side of the display 204 such that the light piping 120 is situated between the display 204 and a user that is viewing content on the display. The light piping 120 may include light locations 302, which may be cavities, recesses, or locations for placement of the lights 118 proximate or in the light locations.

In accordance with one or more embodiments, the lights 118 may be located in or adjacent to a bezel 304, and thus be hidden from view from a user. Although only a portion of the bezel 304 is show in FIG. 3, the bezel may extend around the perimeter of the display 204 and may be used to house the lights 118 and possibly to secure the display 204 and the light piping 120 within the housing 202. When the lights 118 are activated, the light piping 120 may disperse the light that enters through the light locations 302, and thereby substantially light up the display 204 to enable the user to view content rendered on the display.

Figure 4A:
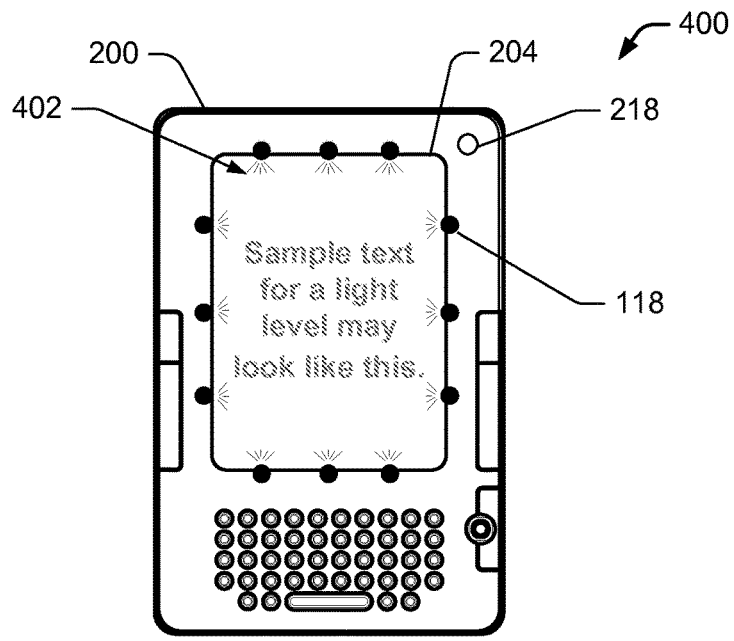
FIGS. 4a and 4b are schematic diagrams showing illustrative lighting patterns of the front light based on a light intensity of ambient light.
Figure 4B:
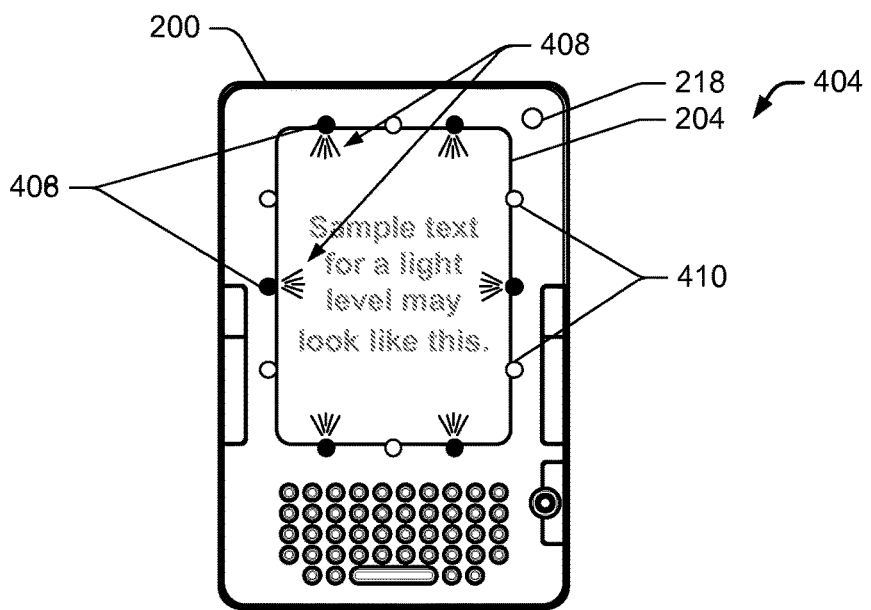

FIGS. 4a and 4b are schematic diagrams showing illustrative lighting patterns of the front light based at least in part on a light intensity of ambient light. As shown, the lights 118 may be located proximate the display 204 and may provide light to illuminate the display when the lights are activated by the display driver 112. The lights 118 may be dimmable and may produce a variable light intensity 402, which may vary based on the measurement of the ambient light. As shown in FIG. 4a, an illustrative lighting pattern 400 includes activation of all of the lights 118 of the front light when the display driver 112 of the eBook reader device 200 determines that front lighting is desirable based at least in part on the measurement of ambient light by the light sensor 218.

FIG. 4b shows another illustrative lighting pattern 404 where a first grouping of lights 406 is activated and produce a light intensity 408 while a second grouping of lights 410 may be inactive (i.e., turned off, dim, etc.). The display driver 112 may selectively activate the first grouping of lights 406, the second grouping of lights 410, or both to vary the light based at least in part on the measurement of ambient light by the light sensor 122. The light piping 120 may disperse the light from the active lights to create a substantially even lighting of the display 204 even when only one of the groupings of lights is activated. Although only two groupings of lights are shown in FIG. 4b, additional groupings of lights may be used to enable further refinement of the light intensity of the front lights. In some embodiments, the lights may also be dimmable to enable further adjustments of an intensity of light used to illuminate the display.

Figure 5:
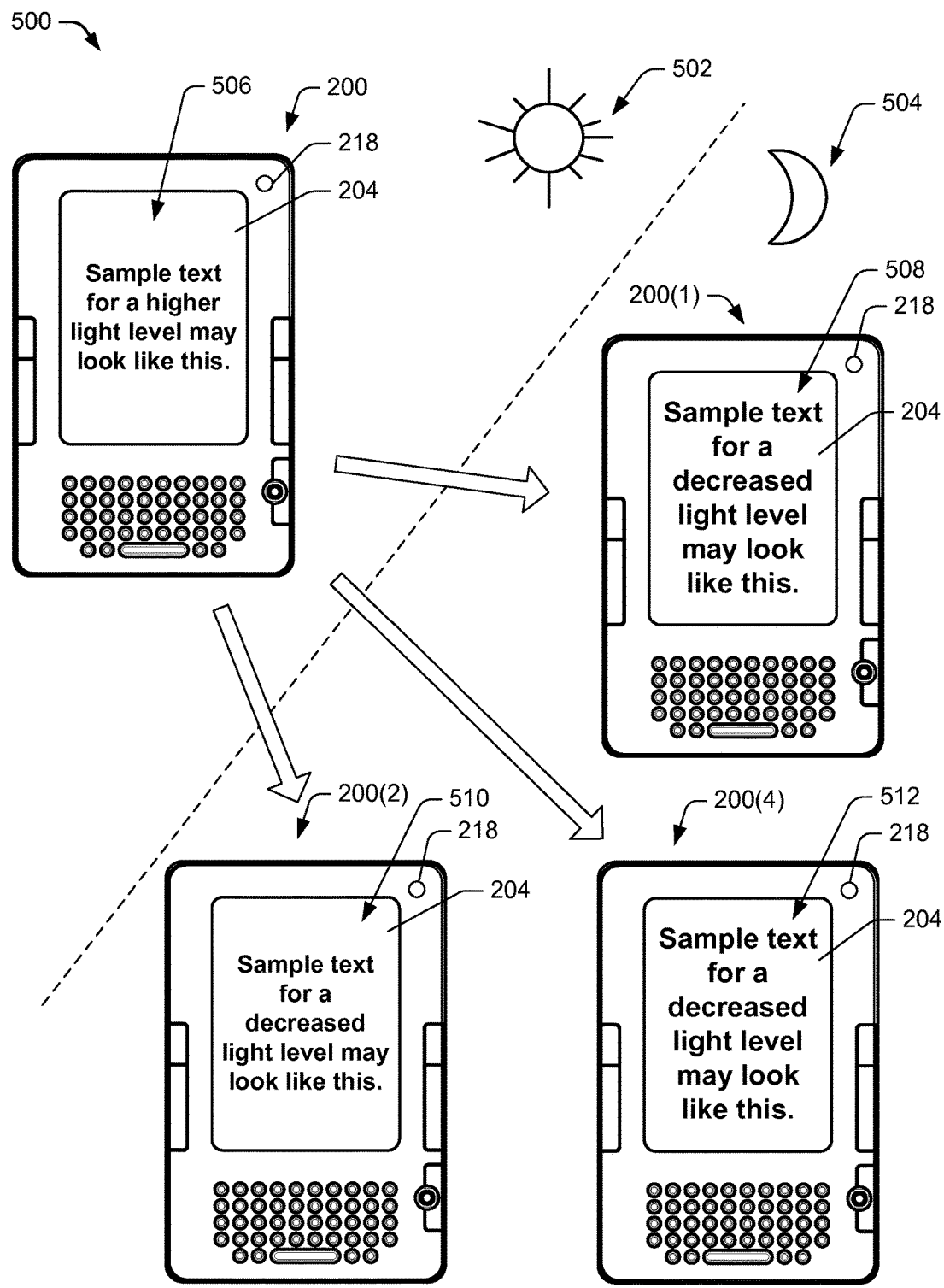
FIG. 5 is a schematic diagram showing illustrative environments that result in possible adjustments to a rendered display and/or intensity of light of the front lights based on a measured light intensity of ambient light.

FIG. 5 is a schematic diagram showing illustrative environments 500 that result in possible adjustments to content presented on an electronic paper display and/or the light intensity of the front lights based at least in part on a measurement of light intensity of ambient light. FIG. 5 is described in the context of a light level transition from a high light intensity environment 502 to a low light intensity environment 504. However, the discussion also applies to a light intensity transition from low light intensity to high light intensity. The light sensor 218 may measure a light intensity of ambient light in the high light intensity environment 502 (e.g., outside in sunny weather) and/or the low light intensity environment 504 (e.g., indoors, shaded location, etc.).

In the high light intensity environment 502, the eBook reader device 200 (or other electronic device 100 of FIG. 1) may include a visual representation of content as a rendered display 506. The rendered display 506 includes attributes such as a contrast setting and size of object (e.g., text, images, etc.). For example, text of the rendered display 506 may have a default font of 12 points (12 pt) and a contrast setting (ratio) of 0.6. The contrast may be measured using an illustrative contrast ratio ranging between 0 and 1, where 0.1 is a low contrast (e.g., dark grey text with light grey background) and 0.9 is a high contrast (e.g., black text with white background).

When the eBook reader device 200 is moved from the high light intensity environment 502 to the low light intensity environment 504, the rendered display 506 may be refreshed or drawn (e.g., via a page turn, etc.) to produce a first rendered display 508 shown in the eBook reader device 200(1). The first rendered display 508 may include text having a font size (e.g. 14 pt) that is greater than the font size in the rendered display 506 (e.g., 12 pt). Similar to a change in the size of the text, other objects (e.g., images, tables, or other visual representations) may be enlarged (or reduced) based on the light intensity measured by the light sensor 218. Increasing a size of objects may reduce the amount of content that may be displayed on the display 204. Thus, the size of the objects may be reduced when the user returns the eBook reader device 200(1) to the high light intensity environment 502.

In some embodiments, when the eBook reader device 200 is moved from the high light intensity environment 502 to the low light intensity environment 504, the rendered display 506 may be refreshed or drawn (e.g., via a page turn, etc.) to produce a second rendered display 510 shown in the eBook reader device 200(2). The second rendered display 510 may include an object (e.g., text, image, etc.) having a contrast (e.g., 0.8) that is greater than the contrast in the rendered display 506 (e.g., 0.06). In this way, a user may be able to better see the text or imagery in the low light intensity environment 504 than would be possible had the contrast not been increased. However, adjusting the contrast may require additional delay when a page is refreshed or drawn. Therefore, the contrast may be lowered when the user returns the eBook reader device 200(2) to the high light level environment 502 to reduce the page turn delay and save power, which is consumed when a page is refreshed or redrawn.

In various embodiments, when the eBook reader device 200 is moved from the high light intensity environment 502 to the low light intensity environment 504, the rendered display 506 may be refreshed or redrawn (e.g., via a page turn, etc.) to produce a third rendered display 512 shown in the eBook reader device 200(3). The third rendered display 512 may include size adjustments discussed with respect to the dynamic size rendered display 508 and contrast adjustments discussed with respect to the dynamic contrast rendered display 510.

In accordance with one or more embodiments, an intensity of the lights 118 may be adjusted (and/or groupings of the lights may be selectively activated) when the eBook reader device 200 is moved from the high-light-intensity environment 502 to the low-light-intensity environment 504 as discussed above, and possibly in combination with some or all of the other changes pertaining to contrast and size of the content. Unlike the changes to contrast and content size, the changes to the light intensity from the front lights may occur dynamically and without refreshing or redrawing the page of content. Accordingly, the eBook reader device 200 is capable of adjusting at least a contrast of content, a size of content, and an intensity of front light to compensate for changing conditions of ambient light that may be measured by the light sensor 218, thereby making it easier for a user to view the content on the display.

Illustrative Operation

Figure 6:
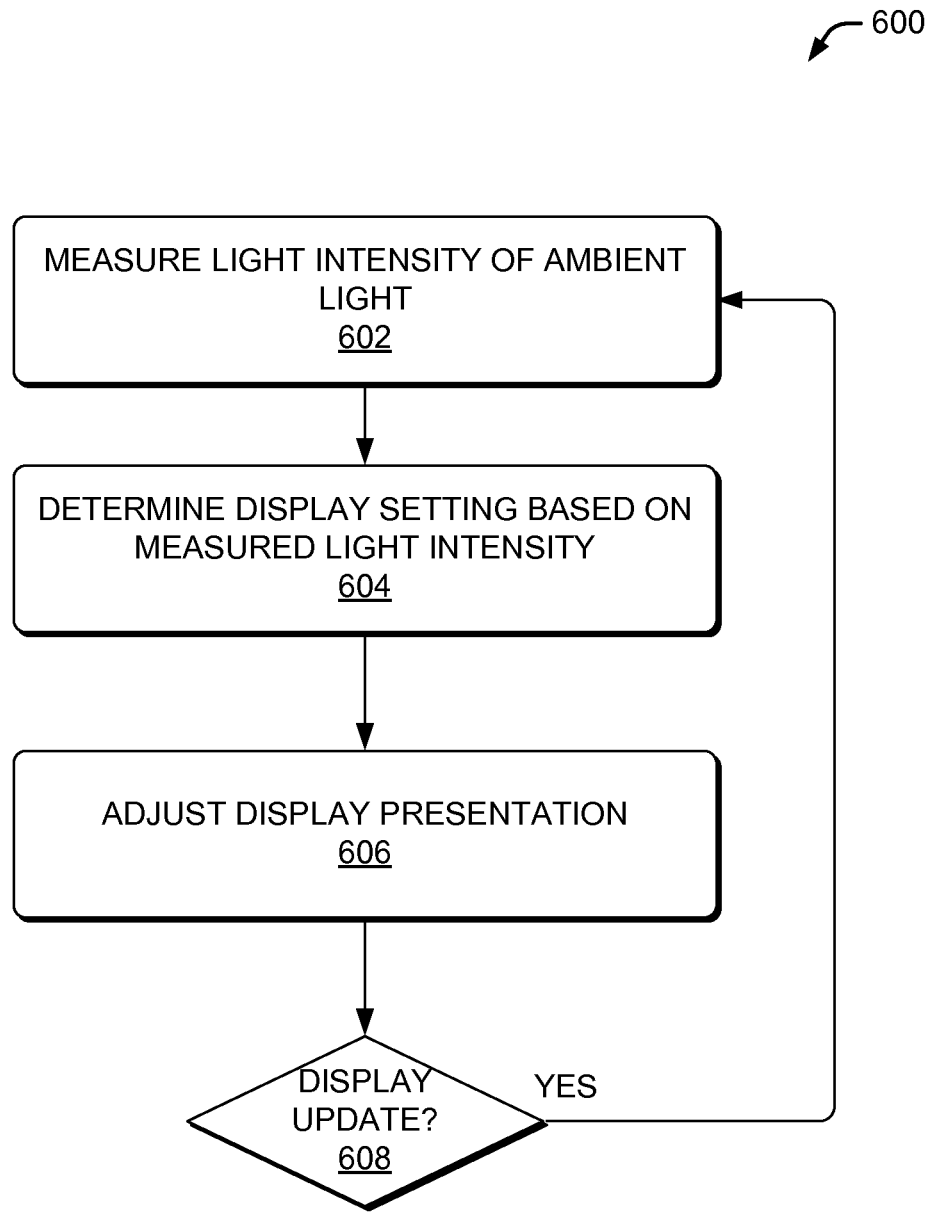
FIG. 6 is a flow diagram of an illustrative process to adjust display settings based on measured light intensity.

FIG. 6 is a flow diagram of an illustrative process 600 to adjust display settings based on measured light intensity of ambient light. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 600, shall be interpreted accordingly. The process 600 is described with reference to FIG. 1, and more specifically, to the electronic display device(s) 100.

At 602, the light sensor 122 may measure a light intensity of ambient light proximate the electronic display device 100. The light sensor 122 may be directed substantially perpendicular to a plane defined by the display 114 of the computing device to measure the intensity of light that is projected toward the display. In some embodiments, the measurement of the light intensity may be used to create a running average light intensity value that is representative of the light intensity over a short period of time. For example, when the light sensor is subjected to inconsistent levels of light (e.g., under a tree during a windy and sunny day), then an average measured light intensity over a time period maybe used as the measured light intensity to reduce or minimize abrupt changes to the presentation of the content. The light sensor 122 may measure an intensity of ambient light on a continual basis, at intervals, in response to a user action, and/or at other times.

At 604, the display driver 112 may determine a display setting based on the light intensity that is measured at the operation 602. For example, the light sensor 122 may generate an electronic signal representative of the light intensity. The display driver 112 may interpret the electronic signal to determine whether it represents a higher or lower light intensity than a previously measured light intensity.

At 606, the display driver 112 may adjust a rendered display of a visual representation of content shown by the display 114. The device driver 112 may also adjust an intensity of the lights 118. For example, when the measured level of ambient light has decreased since a previous measurement, then the display driver 112 may increase the contrast and/or the size of objects of the rendered display and may turn on and/or increase an intensity of the lights 118. Similarly, when the measured level of ambient light has decreased since the previous measurement, the display driver 112 may increase the contrast and/or the size of the objects of the rendered display.

At 608, the display driver 112 may determine whether an update to a visual representation of content of the display is to occur, which may result in another measurement of the ambient light at the operation 602. The decision 608 may occur when a user requests a new page using an eBook reader device (e.g., the eBook reader device 200), requests a page refresh, periodically (e.g., using a fixed or variable time interval), randomly, or using other controls.

Figure 7:
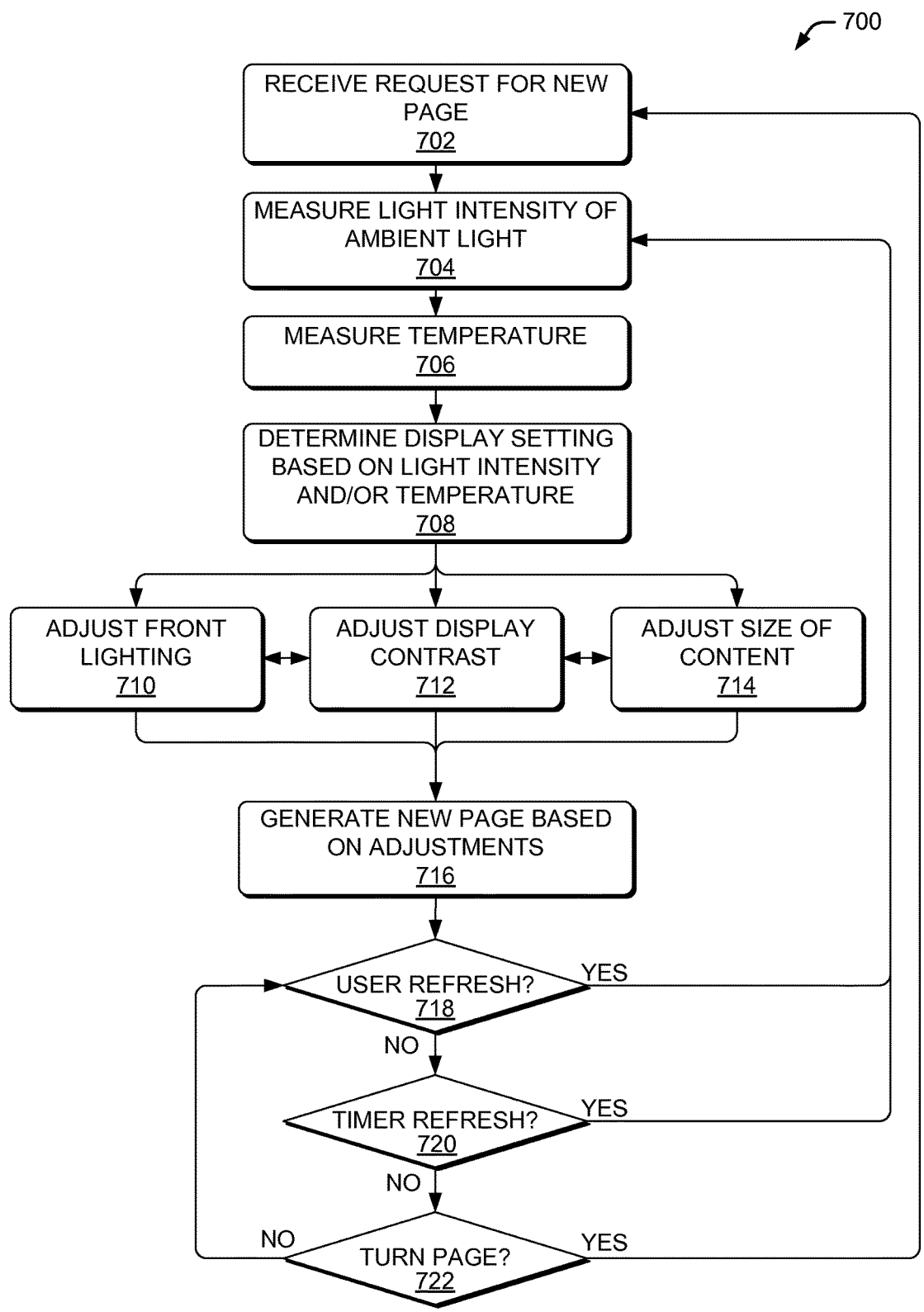
FIG. 7 is a flow diagram of an illustrative process to adjust an electronic paper display based on measured ambient light and temperature.

FIG. 7 is a flow diagram of an illustrative process 700 to adjust an electronic paper display based on measured ambient light and temperature. The process 700 is described with reference to FIG. 1 and FIG. 2, and more specifically, to the eBook reader device 200.

At 702, the eBook reader device 200 may receive a request for a new page. For example, a user may press an input button of the multiple buttons 210 to request a new page of media content (e.g., book, magazine, newspaper, web page, etc).

At 704, the light sensor 122 may measure a light intensity of ambient light proximate the eBook reader device 200. At 706, the temperature sensor 124 may measure a temperature proximate the eBook reader device 200. For example, the temperature sensor 124 may be located proximate the display 114 to enable an approximate temperature measurement of the particles that are used to generate a visual representation of content.

At 708, the display driver 112 may determine a display setting based at least in part on the measured light intensity at the operation 704 and/or the measured temperature at the operation 706. For example, a measurement of an increased temperature may result in shorter page-draw duration (waveform selection) because the particles may become less viscous in the increased temperature and move faster during a refresh or draw of a new page (e.g., page turn). In addition, a measured light intensity may trigger additional use of a higher contrast ratio via the display driver 112 by increasing the movement of the particles using a longer page turn duration. Thus, the display driver 112 may determine a cumulative display adjustment based on changed temperature and light levels.

At 710, the display driver may adjust a light intensity of the lights 118 such as by selectively activating the lights or grouping of the lights and/or by adjusting (dimming or intensifying) the light emitted by the lights 118. The light intensity may be adjusted dynamically on a continual basis without redrawing or refreshing the content on the display in some instances.

At 712, the display driver 112 may adjust the size of objects of the visual representation of content made visible via the display 114. For example, the font size of content may be decreased when an increase in a level of light is detected by the light sensor 122.

At 714, the display driver 112 may adjust a contrast of objects of the visual representation of content made visible via the display 114. For example, the contrast of content may be decreased when an increase in a level of light is detected by the light sensor 122.

At 716, the display driver 112 may generate a new page based on the adjustments of the operations 712 and/or the operation 714. In addition, the display driver 112 may use the measured temperature at the operation 706 to adjust a waveform associated with the particles to compensate for increased or decreased viscosity due to a decrease or increase in temperature, respectively. Accordingly, the device driver 112 may adjust the lighting at 710, the contrast at 712 and/or the size of content at 714, either singly or in combination, to achieve a desired display of the content based at least in part on the measured ambient light.

At 718, the eBook reader device 200 may determine, via an input, whether the user desires a refresh operation. When the user triggers a refresh, such as by selecting the refresh button 224 or by taking other actions that initiate a refresh of the visual representation of the content, the process 700 may proceed to the operation 702.

At 720, the eBook reader device 200 may determine, via a timer of the display driver, whether a refresh operation may be performed on a periodic interval. For example, after a fixed interval of time, the timer of the display driver 112 may trigger a refresh of the visual representation of the content and the process 700 may proceed to the operation 702.

At 722, the eBook reader device 200 may determine whether the user has requested a new page. When a new page request is received, the process 700 may proceed to the operation 702. Absent a new page request, the eBook reader device 200 may continue to loop the process 700 at the operation 718 to determine whether a refresh may take place via a user-initiated command (the operation 718) or system-initiated command (the operation 720).

FIG. 8 is chart of illustrative display profiles 800 that may be used to update a visual representation of content using measured light intensity of ambient light. The display profiles 800 may include inputs for the eBook reader device 200, which may be used to implement the process 700 that is shown in FIG. 7. The display profiles 800 may include a light intensity 802, a temperature 804, and a waveform 806. The values shown in FIG. 8 are for illustrative purposes only. The waveform 806 may include numeric values.

In accordance with some embodiments, the light intensity 802 may be measured by the light sensor 122 while the temperature 804 may be measured by the temperature sensor 124. The waveform 806 may be based on the light intensity 802 and/or the temperature 804. For example, the waveform may be calibrated to produce a desired visual representation of content based on unique properties of the particles while the waveform may be adjusted to provide desirable contrast for various values of the light intensity 802. In some embodiments, the display profiles 800 may include ranges of values for each of the light intensity 802, the temperature, 804, and the corresponding waveform 806.

Illustrative Accessory Front Light

Figure 9:
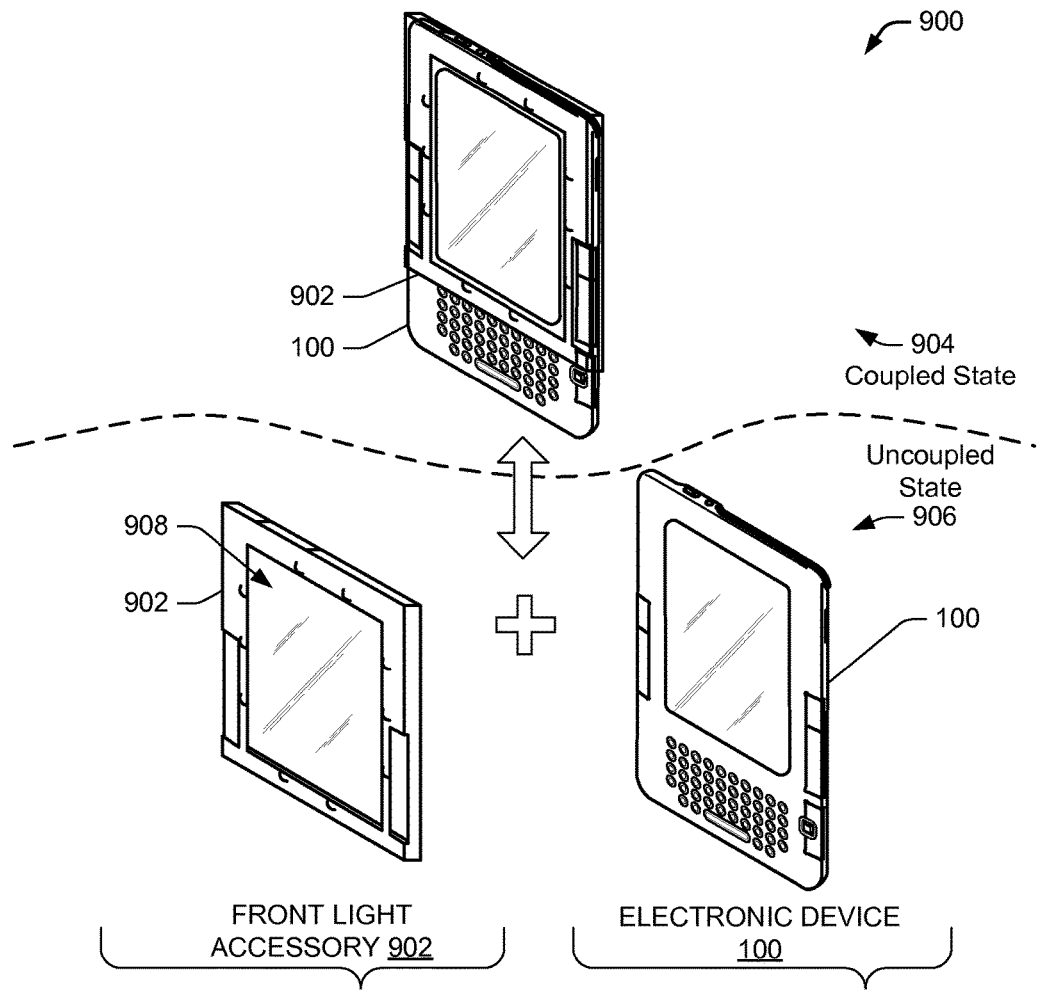
FIG. 9 is schematic diagram of an illustrative accessory front light.

FIG. 9 is schematic diagram of an illustrative environment 900 that includes a front light accessory 902 that is configured to couple to the electronic device 100, such as the eBook reader device 200. The term "couple" may include locking and/or non-locking attachment features that may be incorporated in the front light accessory 902, the electronic device 100, or both to couple the front light accessory 902 and the electronic device 100 as shown in a coupled state 904. In some embodiments, the front light accessory 902 may be formed as a sleeve that slides over a housing of the electronic device 100. When the front light accessory 902 is coupled to the electronic device 100, a front light assembly 908 may be aligned with a display of the electronic device 100 and configured to provide front light to the display. The front light assembly 908 may include the lights 118 and the light piping 120 to illuminate content visible in the display.

In some embodiments, when the front light accessory 902 is coupled to the electronic device 100, the eBook reader device may exchange data (signals), which may determine an operation mode of the front light accessory 902 and/or the eBook reader device. For example, the front light accessory 902 may receive signals from the light sensor 122 of the electronic device and/or may receive power from the electronic device. In various embodiments, the front light accessory 902 may have a self-contained power supply. The electronic device 100 and the front light accessory 902 are shown separately in an uncoupled state 906.

In accordance with various embodiments, the electronic device 100 has electronic device components 910 that include one or more data port(s) 912, the processing unit 106, and/or the display driver 112. The data port(s) 912 may be wired or wireless ports that enable exchange of data and/or power with the accessory sleeve or other components.

In some embodiments, the front light accessory 902 is configured with front light components 914 that may include a securing apparatus 916, power/data connector(s) 918, the lights 118, the light piping 120, a light controller 920, a light sensor 922, and/or a power supply 924 (e.g., batteries, etc.). However, some of these components may reside on the electronic device 100 or be emulated using software on the electronic device 100.

The securing apparatus 120 may include features that may enable coupling the front light accessory 902 to the electronic device 100. In some embodiments, the securing apparatus may be a frame of the front light accessory 902 that is complementary to a form factor of a body of the electronic device 100 such that the front light accessory 902 may surround the electronic device (e.g., sleeve, a clamshell type case, etc.). The frame may include apertures to enable access to features of the electronic device 100 such as user interface controls, etc.

The power/data connector(s) 918 may enable connections between the data port(s) 912 of the electronic device 100 and/or other ports such as a power supply, a USB base, Ethernet base, etc. For example, the front light accessory 902 may include a connector that plugs into a corresponding port (e.g., USB, dedicated port, etc.) on the electronic device 100 to provide power and/or exchange data with the electronic device.

As discussed above, the front light accessory 902 may include the lights 118 and the light piping 120 (collectively, the front light assembly 908). In addition, the front light accessory 902 may include a light controller to control the front light assembly 908 based on signals from a light sensor. In this way, addition of the front light accessory 902 with the electronic device 100 may provide the functionality described above with respect to the processes 600 and 700.

For example, the front light accessory may be controlled by the device driver 112 on the electronic device that receives a measurement of ambient light from the light sensor 122 that is also included in the electronic device. The display driver 112 may transmit a command via the data connector 918 to change an intensity of light provided by the front light accessory 902 using the lights 118. The front light accessory 902 may be used to adjust an intensity of the front light in addition to adjusting a contrast and/or size of content on the screen, as described in the process 700.

Figure 10:
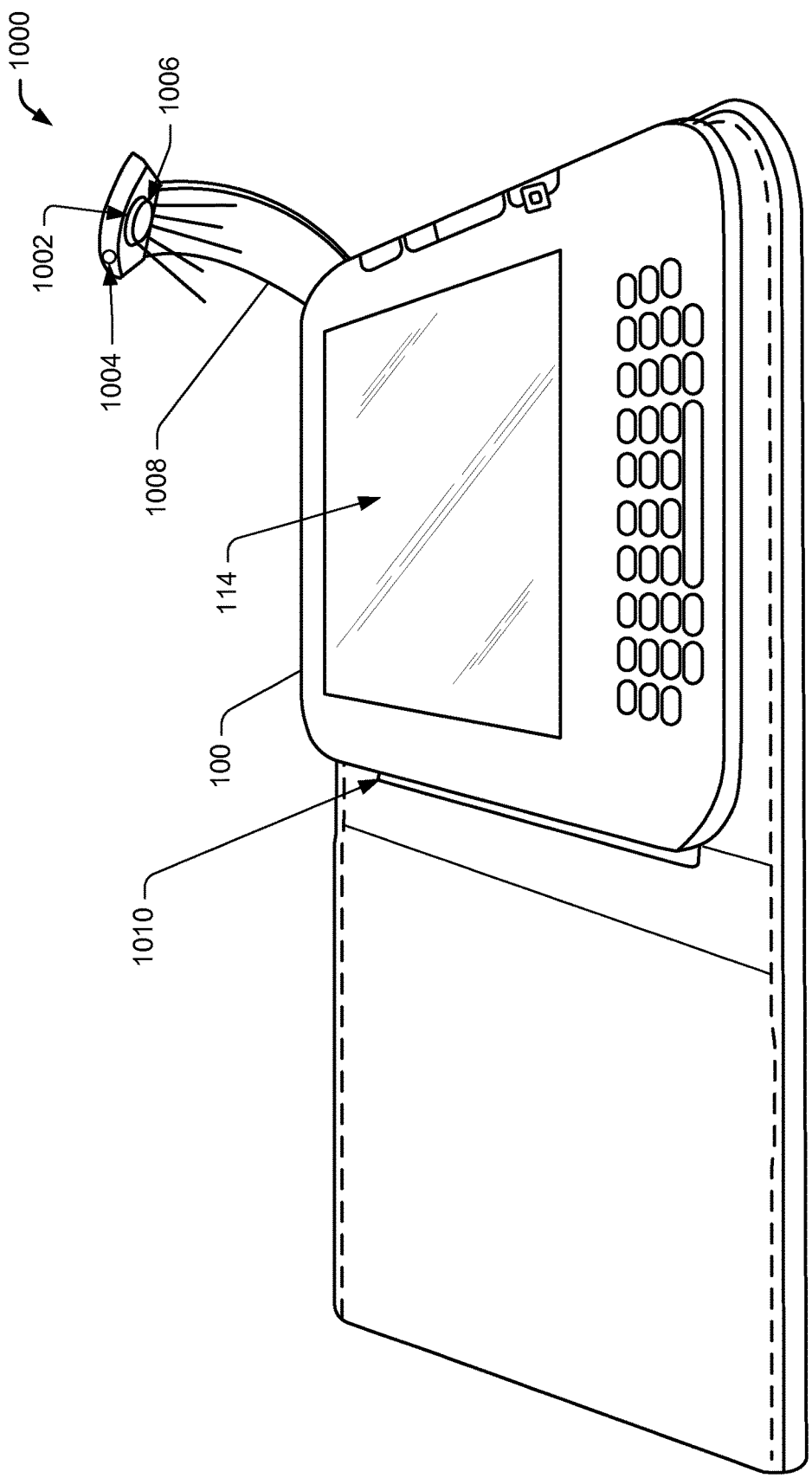
FIG. 10 is a schematic diagram of an illustrative front light accessory that includes a front light that is offset from a display surface and adjustable based on ambient light measured by a light sensor.

FIG. 10 is a schematic diagram of an illustrative front light accessory 1000 that includes a front light 1002 that is offset from the display 114 of the electronic device 100. The front light 1002 may be implemented using one or more lights, such as a plurality of LEDs. In accordance with one or more embodiment, the front light accessory 1000 may include a light sensor 1004 that measures ambient light. The front light accessory 1000 may use the measured ambient light to adjust an intensity of light emitted from the front light 1002 as described in the preceding discussion. However, in some embodiments, the front light accessory 1000 may use a light sensor that is integrated with an electronic device 100 rather than having the light sensor 1004 that is integrated with the front light accessory 1000.

In some embodiments, the front light accessory 1000 may include a lens 1006, which may focus light emitted from the front light 1002 onto the outward facing side of the display 114. In some embodiments, the lens 1006 may be implemented as light piping, which may be placed adjacent to the display 114.

The front light accessory 1000 may include a housing 1008 that attaches the front light 1002, the light sensor 1002, and the lens 1006 to the electronic device 100. The housing 1008 may position the front light 1002 at an offset from the display 114, which may allow the lens 1006 to disperse light emitted from the front light 1002 to cover at least a portion of the display. In some embodiments, the housing 1008 may include an adjustable feature to enable adjustment of a location of the front light 1002 with respect to the display 114. The housing 1008 may form a cover for the electronic device 100, which may cover at least a portion of the electronic device. The housing 1008 may be selectively coupled to the electronic device 100 using accessory features 1010. The front light accessory 1000 may be powered by the electronic device 100, such as via a power port, or may be independently powered by a separate power source.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   an accessory housing having a recessed region that is complementary to an exterior profile of a device housing that encloses an electronic device, the accessory housing configured to removably couple to at least a portion of the exterior profile of the device housing, wherein the accessory housing is independent of the electronic device and independent of the device housing;
   a plurality of lights coupled to a perimeter of the accessory housing;
   a light controller coupled to the accessory housing, the light controller being communicatively coupled to the plurality of lights, the light controller to receive a signal from the electronic device to turn on a subset of the plurality of lights and incrementally adjust an intensity of light emitted from the subset of the plurality of lights; and
   light piping coupled to the accessory housing and proximate to the plurality of lights, the light piping including a plurality of cavities, the plurality of lights being proximate to, or within, the plurality of cavities, the light piping to, in response to the accessory housing being removably coupled to the device housing:
      receive light from one or more of the plurality of lights through one or more of the plurality of cavities; and
      disperse the light from the one or more of the plurality of lights over a reflective light display of the electronic device.

2. The apparatus as recited in claim 1, further comprising a light sensor coupled to the accessory housing to measure a light intensity of ambient light as a measured light intensity, and wherein the intensity of light emitted from the subset of the plurality of lights is selectively controlled based at least in part on the light intensity measured by the light sensor.

3. The apparatus as recited in claim 2, wherein the light controller is configured to selectively control the intensity of light emitted from the subset of the plurality of lights by dimming or intensifying the subset of the plurality of lights based at least in part on the light intensity measured by the light sensor.

4. The apparatus as recited in claim 1, wherein the light controller is configured to control the intensity of light emitted from the subset of the plurality of lights based at least in part on user input.

5. The apparatus as recited in claim 1, wherein the accessory housing is formed as a sleeve that removably couples to the device housing associated with the electronic device, wherein coupling the sleeve to the device housing comprises inserting the device housing into the sleeve, and wherein the light piping associated with the sleeve aligns adjacent to the reflective light display of the electronic device in response to the sleeve being removably coupled to the device housing.

6. The apparatus as recited in claim 1, wherein the accessory housing removably couples to at least the portion of the exterior profile of the device housing using an accessory attachment.

7. The apparatus as recited in claim 1, further comprising at least one of a power connector to connect the plurality of lights to a power port of the electronic device or a power supply within the accessory housing to provide power to the plurality of lights.

8. A front light accessory comprising:
   an accessory housing having an accommodating portion that is complementary to an exterior profile of a device housing that encloses an electronic device, the accommodating portion configured to removably couple to at least a portion of the exterior profile of the device housing, wherein the accessory housing is independent of the electronic device;
   a light sensor coupled to the accessory housing to measure a light intensity of ambient light as a measured light intensity, the light sensor being communicatively coupled to a display driver of the electronic device;
   a plurality of lights coupled to a perimeter of the accessory housing, the plurality of lights to be selectively controlled by the display driver of the electronic device by the display driver turning on a subset, but not all, of the plurality of lights, based at least in part on the measured light intensity from the light sensor; and
   light piping coupled to the accessory housing, the light piping including a plurality of recesses, a first light of the plurality of lights being proximate to, or within, a first recess of the plurality of recesses, a second light of the plurality of lights being proximate to, or within, a second recess of the plurality of recesses, the light piping to, in response to the accessory housing being removably coupled to the device housing:
      receive light from one or more of the plurality of lights through one or more of the plurality of recesses; and
      disperse the light over a display of the electronic device.

9. The front light accessory as recited in claim 8, wherein the display comprises a reflective light display, and wherein the light piping aligns with the reflective light display in response to the accessory housing being removably coupled to the device housing.

10. The front light accessory as recited in claim 8, further comprising a display controller in communication with the plurality of lights and the light sensor to adjust an amount of light emitted from the subset of the plurality of lights based at least in part on the measured light intensity from the light sensor.

11. The front light accessory as recited in claim 8, wherein the light sensor is integrated in the accessory housing, the front light accessory further comprising a data connector integrated in the accessory housing and configured to facilitate exchange of data with the electronic device via the data connector, wherein the measured light intensity is transmitted to the display driver of the electronic device via the data connector, and wherein the subset, but not all, of the plurality of lights are turned on, or an amount of light emitted from the subset of the plurality of lights is controlled, based at least in part on a signal from the display driver received via the data connector.

12. The front light accessory as recited in claim 8, wherein the accessory housing forms a sleeve that attaches to the device housing by placing the sleeve over at least the portion of the exterior profile of the device housing, and wherein light piping aligns with the display of the electronic device in response to the sleeve being placed over at least the portion of the exterior profile of the device housing.

13. The front light accessory as recited in claim 8, wherein the plurality of lights are configured to be selectively controlled by the display driver at least one of turning on, turning off, intensifying, or dimming, the subset of the plurality of lights.

14. An apparatus comprising:
    an accessory housing configured to removably couple to an exterior profile of a device housing that encloses an electronic device, the accessory housing being independent of the electronic device;
    a light sensor coupled to the accessory housing to measure a light intensity of ambient light as a measured light intensity;
    one or more lights coupled to a perimeter of the accessory housing, the one or more lights to be selectively controlled based at least in part on the measured light intensity from the light sensor; and
    light piping coupled to the accessory housing, the light piping including one or more recesses, the one or more lights being proximate to, or within the one or more recesses, the light piping to, in response to the accessory housing being removably coupled to the device housing:
        receive light emitted from the one or more lights through the one or more recesses; and
        disperse the light over an outward facing side of a reflective light display of the electronic device.

15. The apparatus as recited in claim 14, wherein the one or more lights are located around at least a portion of the accessory housing.

16. The apparatus as recited in claim 14, wherein the accessory housing includes an adjustment feature to enable adjustment of a location of the one or more lights with respect to the reflective light display.

17. The apparatus as recited in claim 1, wherein the reflective light display of the electronic device is visible through the light piping in response to the accessory housing removably coupling to at least the portion of the exterior profile of the device housing.

18. The front light accessory as recited in claim 8, wherein the light sensor is configured to measure a first light intensity of the ambient light at a first point in time and a second light intensity of the ambient light at a second point in time, and wherein the front light accessory is further configured to:
    determine an average measured light intensity value based at least in part on the first light intensity and the second light intensity; and
    transmit a signal to the electronic device to adjust a contrast of the display of the electronic device based at least in part on the average measured light intensity value.

19. The apparatus as recited in claim 1, wherein the accessory housing forms a clamshell casing that attaches to at least the portion of the exterior profile of the device housing, and wherein the light piping aligns with the reflective light display of the electronic device in response to the clamshell casing being placed over at least the portion of the exterior profile of the device housing.

20. The front light accessory as recited in claim 8, wherein the display driver of the electronic device is further configured to adjust at least one of a contrast of content or a size of the content that is displayed on the display of the electronic device, based at least in part on the measured light intensity from the light sensor.

21. The apparatus as recited in claim 14, wherein the light sensor is integrated in the accessory housing, the apparatus further comprising:
    a data connector integrated in the accessory housing and configured to facilitate exchange of data with the electronic device via the data connector, wherein the measured light intensity is transmitted to the electronic device via the data connector, and wherein the one or more lights are selectively controlled based at least in part on a signal from the electronic device received via the data connector.

\* \* \* \* \*